P. DAIMLER.
CHANGE SPEED GEARING.
APPLICATION FILED JUNE 13, 1911.
1,023,553.
Patented Apr. 16, 1912.
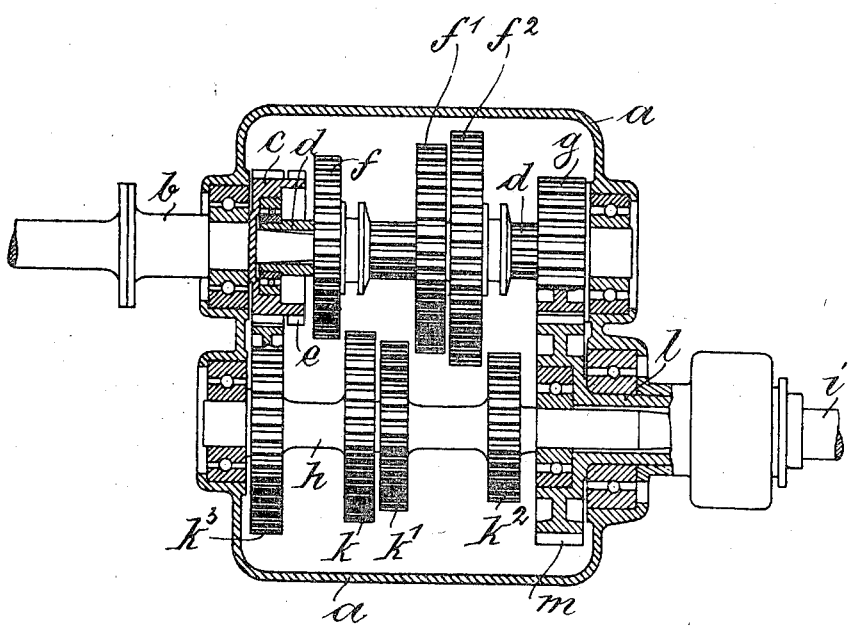
Witnesses:
Corinne Myers.
Vera Paulsen.
Inventor:
Paul Daimler
by L. K. Böhm,
Attorney

UNITED STATES PATENT OFFICE.

PAUL DAIMLER, OF CANNSTATT, GERMANY, ASSIGNOR TO DAIMLER MOTOREN-GE-SELLSCHAFT, OF STUTTGART, GERMANY.

CHANGE-SPEED GEARING.

1,023,553.  Specification of Letters Patent.  Patented Apr. 16, 1912.

Application filed June 13, 1911. Serial No. 632,882.

*To all whom it may concern:*

Be it known that I, PAUL DAIMLER, a subject of the King of Wurttemberg, and resident of 87 Waiblingerstrasse, Cannstatt, in the Kingdom of Wurttemberg, German Empire, have invented certain new and useful Improvements in Change-Speed Gearing, of which the following is a specification.

The present invention relates to a change speed gearing for motor road vehicles of the type in which the driving shaft and the driven shaft are not in alinement with each other and in which a transmission shaft is arranged in alinement with the driving shaft and provided with slidable change wheels, the driving shaft being in constant gear with a countershaft transmitting motion to the transmission shaft, which drives the driven shaft.

According to the present invention the counter shaft is arranged axially in alinement with the driven shaft the driven shaft being in constant gear with the transmission shaft. The arrangement is such that with the exception of the highest speed all the speeds are obtained by means of a triple transmission, the driving being transmitted from the driving shaft to the counter shaft and from thence back to the transmission shaft in alinement with the driving shaft, and the drive being transmitted by the transmission shaft to the shaft to be driven.

In order that the invention may be more clearly understood, reference is made to the accompanying drawing, which shows by way of example the preferred method of carrying out the invention, the view showing the gearing partly in section.

The gearing is contained within a suitable gear case $a$, which forms a bearing for one end of the driving shaft $b$, which carries at this end and within the case $a$ a gear wheel $c$ secured thereon. In alinement with the driving shaft $b$ is arranged a transmission shaft $d$ located in bearings at one end in the gear case $a$ and hollow at its other end so as to rotate upon an extension of the driving shaft $b$. The transmission shaft $d$ carries change gear wheels $f$, $f'$ $f^2$ splined thereon, the gear wheel $f$ being adapted in one position to be coupled with the gear wheel $c$ by means of a coupling $e$ shown on the drawings as integral with the gear wheel $c$. In alinement with the shaft $i$ to be driven is a counter shaft $h$ carrying fixed gear wheels $k$, $k$, $k^2$, $k^3$ and located in bearings at one end in the gear case $a$ and at its other end adapted to rotate within the extended boss of a gear wheel $m$ which is in fixed relation to the driven shaft $i$. Motion is transmitted to the counter shaft $h$ from the driving shaft $b$ by means of the gear-wheels $c$ and $k^3$ which are constantly in gear with one another and the transmission shaft $d$ and driven shaft $i$ are likewise in constant engagement with one another by means of a gear-wheel $g$ fixed on the shaft $d$ and in engagement with the gear-wheel $m$. The high speed is transmitted to the driving shaft $i$ by sliding the gear wheel $f$ toward the left until the latter is in engagement with the coupling $e$ whereupon the driving shaft $b$ is coupled directly to the transmission shaft $d$ which transmits the drive to the driven shaft $i$ through the gear wheels $g$ and $m$.

To vary the speed of the driven shaft $i$ the gear wheel $f$ is moved to the right until the latter is in gear with the gear wheel $k$ on the counter shaft, whereupon the driving shaft $b$ and transmission shaft $d$ will be uncoupled and motion transmitted through the gear wheels $c$ and $k^3$ to the countershaft $h$ and therefrom through the gear wheels $k$ and $f$ to the shaft $d$ and from thence through the gear wheels $g$ and $m$ as before to the driven shaft $i$. Other speeds may also be obtained by sliding the gear wheel $f$ into the position shown on the drawing whereupon the latter is thrown out of gear with the gear wheel $k$ without being coupled to the gear wheel $c$, one or other of the gear wheels $f'$ and $f^2$ being put into engagement with the gear wheels $k'$ $k^2$ respectively according to the velocity ratio desired.

I claim:—

1. A change speed gearing comprising in combination, a driving shaft, a driven shaft out of alinement therewith, a transmission shaft in alinement with the driving shaft and adapted to be coupled therewith, gearing whereby the transmission shaft and driven shaft are in constant gear with one another, a counter shaft in alinement with the driven shaft, said counter shaft being in constant gear with the driving shaft, and change speed gear wheels on said counter shaft and transmission shaft whereby when said transmission shaft is uncoupled from the driving shaft, motion is transmitted to the transmission shaft from the driving shaft through said counter shaft.

2. A change speed gearing comprising in combination, a driving shaft, a driven shaft out of alinement therewith, a transmission shaft in alinement with the driving shaft and adapted to be coupled therewith, gearing whereby the transmission shaft and driven shaft are in constant gear with one another, a counter shaft in alinement with the driven shaft, said counter shaft being in constant gear with the driving shaft, gear wheels fixed on said counter shaft and gear wheels splined on said transmission shaft and adapted to be put into gear with the gear wheels fixed on said counter shaft.

3. A change speed gearing comprising in combination, a driving shaft, a driven shaft out of alinement therewith, a gear case, bearings in said gear case supporting the meeting ends of said driving and driven shafts, a gear wheel located in said gear case and in fixed relation with said driving shaft, a transmission shaft in alinement with said driving shaft and rotatably supported in said gear case, a counter shaft arranged in axial alinement with said driven shaft and rotatably supported in said gear case, a fixed gear wheel on one end of said counter shaft gearing with said gear wheel in fixed relation with the driving shaft, a gear wheel fixed at one end upon said transmission shaft, a gear wheel in fixed relation with the driven shaft, and gearing with said gear wheel on the transmission shaft, fixed change speed gear wheels on said counter shaft, change speed gear wheels splined on said transmission shaft and adapted to be put into gear with the fixed change speed gear wheels on said counter shaft, a coupling carried by the gear wheel in fixed relation with the driving shaft and adapted in one position of one of the change speed gear wheels splined on the transmission shaft to couple said driving shaft and transmission shaft, said last mentioned change speed gear wheel being capable of taking up an intermediate position in which the same is uncoupled from the gear wheel in fixed relation with the driving shaft while being at the same time out of gear with its corresponding change speed gear wheel fixed on the counter shaft.

4. A change speed gearing comprising in combination, a driving shaft having an extension thereon, a driven shaft out of alinement therewith, a gear case, bearings in said gear case supporting the meeting ends of said driving and driven shafts, a gear wheel located in said gear case and in fixed relation with said driving shaft, a transmission shaft in alinement with said driving shaft and hollow at one end, a bearing in said gear case rotatably supporting the solid end of said transmission shaft, the hollow end of said transmission shaft, being rotatably supported on the extension of said driving shaft, a countershaft arranged in axial alinement with said driven shaft, a bearing in said gear case rotatably supporting one end of said counter shaft, a gear wheel in fixed relation with the driven shaft and having a hollow boss rotatably supporting the other end of said counter shaft, a fixed gear wheel on one end of said counter shaft gearing with said gear wheel in fixed relation with the driving shaft, a gear wheel fixed at one end upon said transmission shaft and gearing with the gear wheel in fixed relation with the driven shaft, fixed change speed gear wheels on said counter shaft, change speed gear wheels splined on said transmission shaft and adapted to be put into gear with the fixed change speed gear wheels on said counter shaft, a coupling carried by the gear wheel in fixed relation with the driving shaft and adapted in one position of one of the change speed gear wheels splined on the transmission shaft to couple said driving shaft and transmission shaft, said last mentioned change speed gear wheel being capable of taking up an intermediate position in which the same is uncoupled from the gear wheel in fixed relation with the driving shaft while being at the same time out of gear with its corresponding change speed gear wheel fixed on the counter shaft.

In witness whereof I have hereunto set my hand in the presence of two witnesses.

PAUL DAIMLER.

Witnesses:
  ROBERT WALAUR,
  ERNEST ENTENMANN.